Feb. 25, 1930.  W. T. SOULIS  1,748,525
INTERNAL COMBUSTION ENGINE PISTON
Filed May 23, 1927   5 Sheets-Sheet 1

INVENTOR.
Wilbur T. Soulis

Feb. 25, 1930.  W. T. SOULIS  1,748,525
INTERNAL COMBUSTION ENGINE PISTON
Filed May 23, 1927  5 Sheets-Sheet 2

INVENTOR.
Wilbur T. Soulis

Feb. 25, 1930.  W. T. SOULIS  1,748,525
INTERNAL COMBUSTION ENGINE PISTON
Filed May 23, 1927  5 Sheets-Sheet 3

INVENTOR.
Wilbur T. Soulis

Feb. 25, 1930.　　W. T. SOULIS　　1,748,525
INTERNAL COMBUSTION ENGINE PISTON
Filed May 23, 1927　　5 Sheets-Sheet 4

INVENTOR.
Wilbur T. Soulis

Feb. 25, 1930.  W. T. SOULIS  1,748,525
INTERNAL COMBUSTION ENGINE PISTON
Filed May 23, 1927  5 Sheets-Sheet 5

INVENTOR.
Wilbur T. Soulis

Patented Feb. 25, 1930

1,748,525

UNITED STATES PATENT OFFICE

WILBUR T. SOULIS, OF EASTON, PENNSYLVANIA

INTERNAL-COMBUSTION ENGINE PISTON

Application filed May 23, 1927. Serial No. 193,458.

The present invention relates generally to internal combustion engines and is more particularly directed to improvements in internal combustion engine pistons and the method of constructing the same, whereby the efficiency of internal combustion engines in which my invention is embodied will be materially increased.

As is well known, the weight of the cast iron pistons now generally employed in internal combustion engines has long been recognized by automotive engineers as a serious factor in retarding the development of high speed engines of that type. In the running of the cast iron pistons, considerable power must necessarily be consumed in overcoming their inertia for the amount of fuel consumed. Furthermore, excessive weight of the piston causes unnecessary vibration and naturally increases the wear on the cooperating parts of the engine structure. Also, when aluminum or aluminum alloy pistons are used the expansion of the cylinder walls is so great that the piston cannot be fitted to limits close enough to function well mechanically or to prevent oil pumping, loss of compression or the noisy slap of the piston against the cylinder wall. Also the wear on the piston is so great that the life of an aluminum piston is only a fraction of that of a piston made of iron or other metals whose wearing qualities are good. Also the aluminum piston will embed any foreign substance in its walls causing the piston to charge, and lap the cylinder walls which in turn will wear the engine cylinder walls out of round and oversize. Various attempts have been made to overcome these and those disadvantages which reside in the use of iron and aluminum alloy pistons, by producing pistons of steel, or a cast metal such as aluminum or an aluminum alloy. These efforts, however, have been mainly unsuccessful from a practical viewpoint, owing to the difficulties involved in production and in obtaining a structure possessing the proper coefficient of expansion relatively to the wall of the engine cylinder, to obtain the maximum engine performance under varying loads and conditions of operation. It has also been found that where the piston is made of aluminum the skirt wear is excessive.

The general object of this invention, therefore, is to increase the efficiency of internal combustion engines by reducing the weight and vibration and the wear incident thereto on the cooperating parts, also to construct an internal combustion engine piston of aluminum or some light weight metal with high thermal conductivity having cast or molded or made integral therewith a metal member of lower coefficient of expansion that will prevent the excessive expansion of the piston when heated in an engine, obtaining increased power and speed, reducing the fuel consumption and securing a greater range of flexibility of operation. Also to have cast integral with the piston walls wearing members which are held in place during the casting of the piston proper by attaching these wearing members to the expansion member previous to the casting of this assembled unit in the piston proper. More specifically, the object of this invention is to provide a piston for internal combustion engines and a method of constructing the same whereby the general objects above set forth may be attained.

A further object of my invention resides in the provision of a piston for internal combustion engines by practicing of my method of construction, which is formed or built up of two or more metals possessing different characteristics, such, for instance, as steel, cast iron and aluminum, wherein the advantages inherent to each metal may be utilized for the production of a composite strucutre possessing qualities which could not be obtained by the use of one or the other of said metals separately.

My invention also contemplates an internal combustion engine piston as heretofore described which may be made up of steel and cast iron and aluminum alloy or such as steel and bronze with aluminum or similarly hard and soft metals, possessing different qualities as weight, coefficient of expansion and wear, in which the parts of the piston formed of the different metals are so united that a homogeneous structure will be provided which will possess all the advantages of a piston of a single casting or other integral structure without its disadvantages.

This invention further comprehends a method of producing an internal combustion engine piston whereby the structure may be economically manufactured, the finished product possessing greater strength and durability than pistons of the conventional types. Furthermore, the internal combustion engine pistons made by the practicing of my invention will be lighter in weight than the cast iron pistons so that the wear or scoring of the cylinder walls resulting from their use will be substantially eliminated or reduced to a minimum.

Other objects and advantages of the employment of my invention will become obvious as the description proceeds, and I would have it understood that I reserve unto myself the full range of equivalents in structure and uses, to which I may be entitled under my invention in its broadest aspect.

I shall now proceed to describe my invention with reference to the accompanying drawings, wherein I have illustrated certain preferred embodiments for the purpose of presenting a clear and comprehensive disclosure, it being obvious that my invention is susceptible of taking other forms without departing from the scope and spirit thereof.

Figure 3:
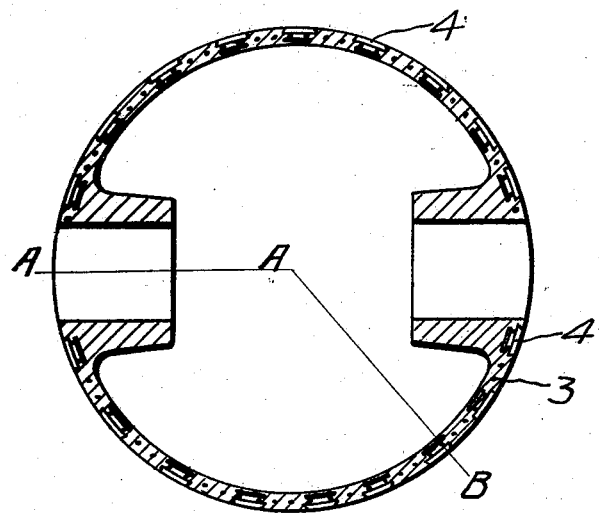
Fig. 3 is a plan, in section taken through the wrist pin bosses at C—C.
Figures 1, 2:
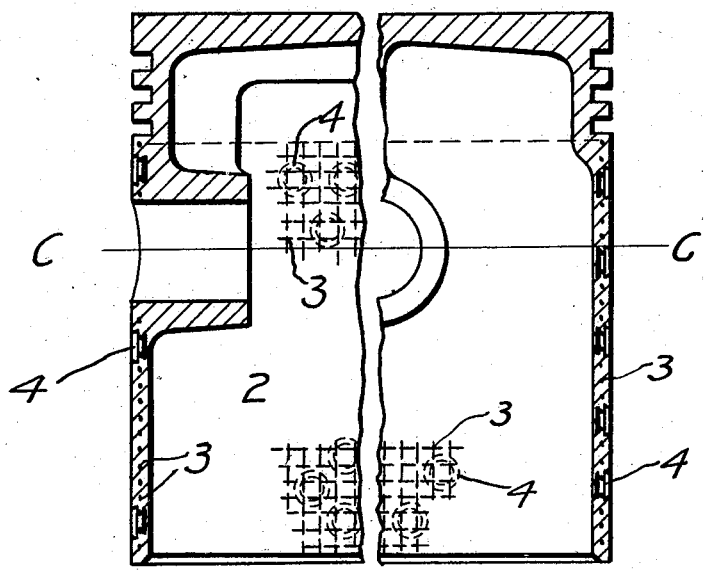
Fig. 1 is an elevation, in section, taken through the wrist pin boss at A—A, of a practical form of my invention embodying a wire mesh with knobs or rings or segments or buttons of any shape or size inserted in or attached thereto, by heading over, bending over or by a spot weld, which is cast in the skirt of the piston.
Fig. 2 is an elevation in section of a practical form of my invention, taken through a portion other than at the wrist pin boss, A—B.
Figure 5:
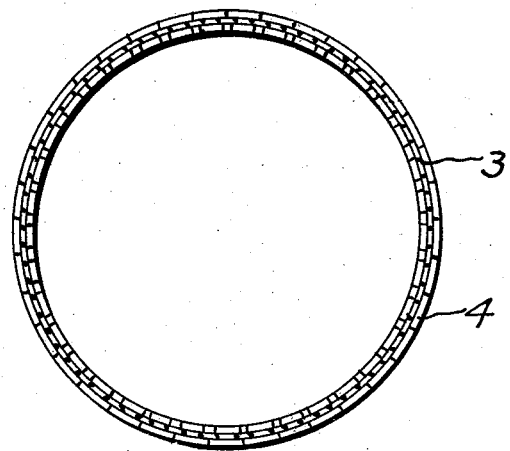
Fig. 5 is an elevation of Fig. 4.
Figure 6:
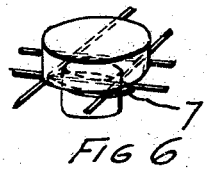
Fig. 6 is a view showing a form of button which may be attached to the reinforcing member.
Figure 4:
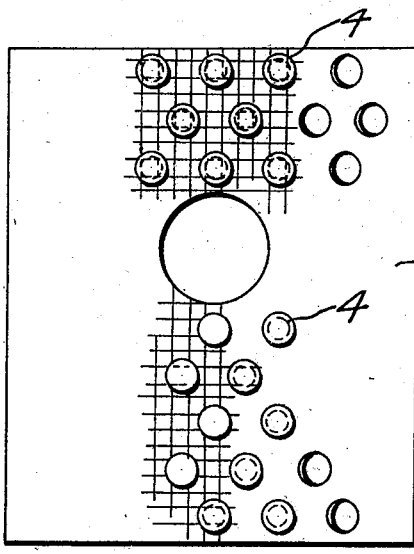
Fig. 4 is an elevation of the metal insert with knobs or buttons attached thereto.
Figure 7:
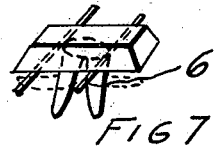
Fig. 7 is a view showing another form of button or knob which may be attached to the reinforcing member.
Figure 8:
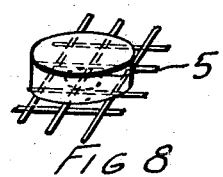
Fig. 8 is a view showing another form of button which may be attached to the reinforcing member.

Referring now to the drawings in detail in which like characters of reference are employed to designate similar parts throughout the several views, 2, shown in Fig. 1 and Fig. 2 and Fig. 3, indicates a piston body consisting of a light cast metal such as aluminum or aluminum alloy with a wire mesh reinforcing member 3 with bearing knobs or buttons 4 cast integrally with the piston proper, after which the surfaces of the piston are machined to form the ring grooves and the bearing surface. 5 shows the wrist pin bosses cast integral with the piston proper. In Figs. 4 and 5 are shown the reinforcing member 3 with the bearing members 4 attached to the reinforcing member 3 by spot welding shown in Fig. 8 at 5 bending over or locking in as shown at Fig. 7 at 6 heading over as shown at Fig. 6 at 7.

Figure 11:
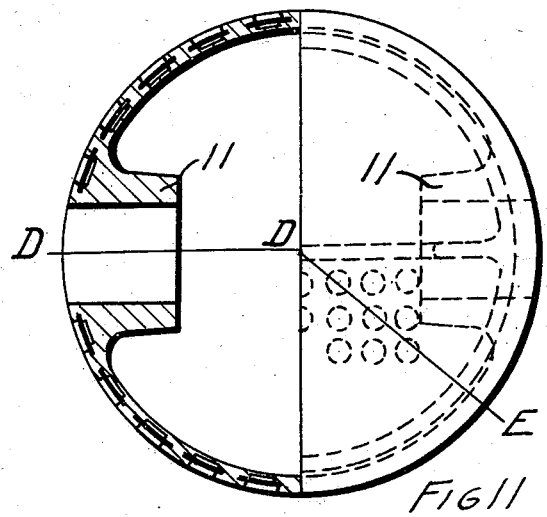
Fig. 11 is a plan partly in section showing the cast in reinforcing member buttons and the holes in the reinforcing member in the head.
Figures 9, 10:
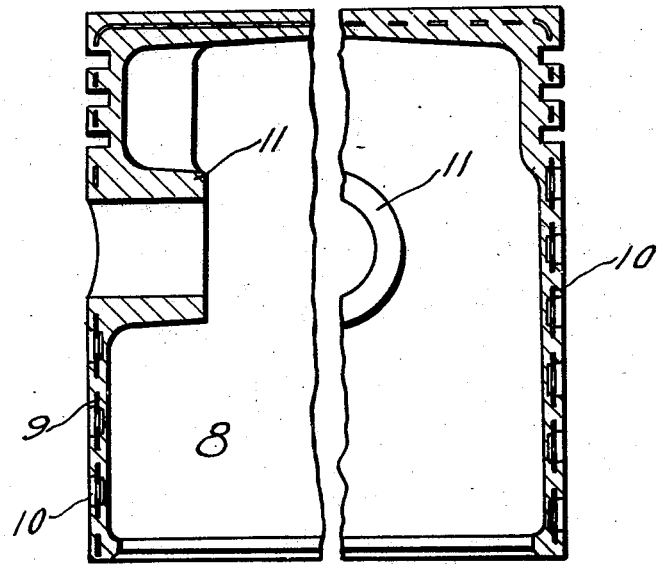
Fig. 9 is another form of my invention taken through D—D of Fig. 11 showing the reinforcing member made of a drawn, then perforated shell which extends into the head section and the perforations serving as a lock through which the metal flows and also into which the buttons or rivets may be attached.
Fig. 10 is an elevation through D—E of Fig. 11 showing a section of the piston through a section at a point different other than at the wrist pin boss.

8 in Fig. 9 indicates a piston body of another type of construction showing cast in reinforcing member 9 shown in Fig. 9, Fig. 10 and Fig. 11, with the buttons 10 attached to reinforcing member 9 and cast integral with the piston proper 8. 11 indicates the wrist pin bosses cast integral with the piston proper 8.

Figure 13:
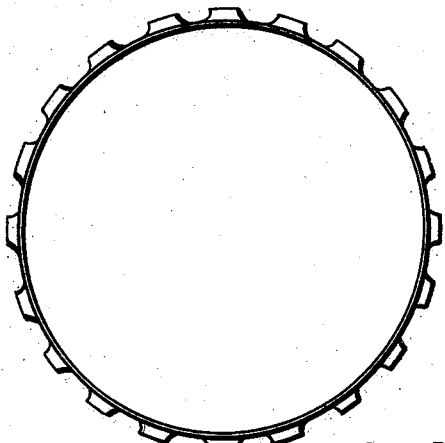
Fig. 13 is a plan of Fig. 12 showing holes in the head portion.
Figure 12:
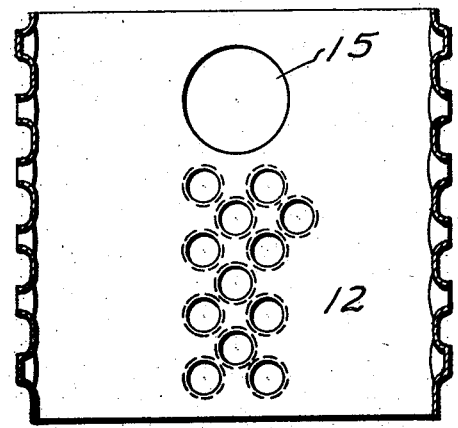
Fig. 12 is another form of reinforcing member with projections thereon to act as the wearing surface in place of the buttons when cast in the piston proper.

12 shown in Fig. 12 and Fig. 13, indicates the reinforcing member made of a thin shell with projections formed on its surface shown at 13 and 14, to form the wearing surface. 15 indicates a hole in the reinforcing member to allow the wrist pin hole to be cast or drilled without cutting the shell 12.

Figure 15:
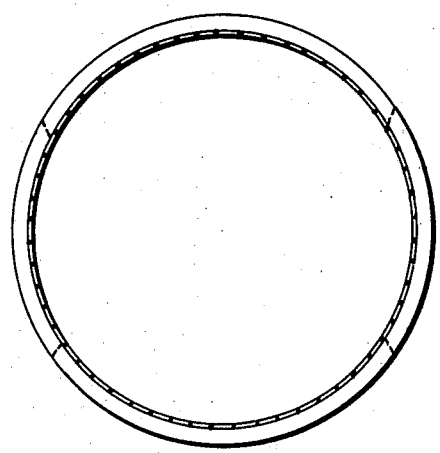
Fig. 15 is a plan view of Fig. 14.
Figure 14:
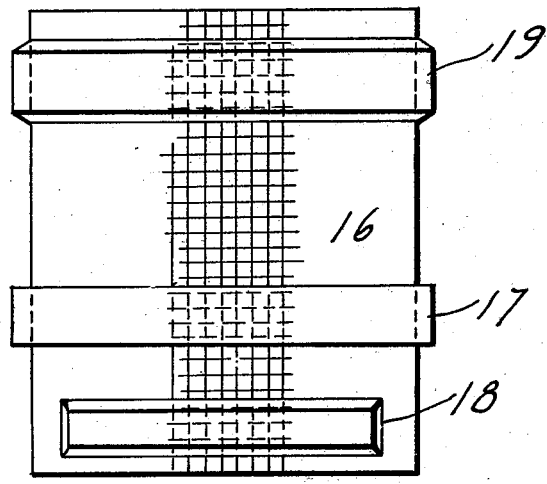
Fig. 14 is another form of reinforcing member with bearings and segments attached thereto.

16 shown in Fig. 14 and Fig. 15, shows a wire mesh reinforcing member with bearing rings 19 and 17 with segments 18 attached thereto.

It is manifest that in some instances of construction it may be desirable to modify the shape of the reinforcement member or to modify the shape and size or number or spacing of the bearing buttons, rings or segments. It is obvious that if the reinforcing member be of a lower coefficient of expansion than the piston skirt or head section it will hold the aluminum or aluminum alloy from expansion due to the heat of combustion while the bearing buttons or rings will be of a metal of better bearing qualities than the piston proper will give a long life to the piston.

I claim:

1. An internal combustion engine piston comprising a relatively light body of cast metal, a perforate metallic reinforcing member with spaced wearing elements attached thereto, wrist pin bosses, a head having a space where packing ring grooves are cut, all of which are permanently united by casting.

2. An internal combustion engine piston comprising a relatively light body of cast metal, a perforate metallic reinforcing member embedded therein, spaced wearing members attached to said reinforcing member, wrist pin bosses, a head having a space where packing ring grooves are cut, all of which are permanently united by casting.

3. An internal combustion engine piston composed of a body of light metal of relatively high coefficient of thermal expansion, a perforate metallic member of lower coefficient of thermal expansion than said body and molded therein, spaced wearing means attached to the perforate member, all of which are cast together.

4. The combination of a light weight internal combustion engine piston, with a cylindrical perforate metallic reinforcing member embedded within the walls of the piston, spaced wearing members attached to the reinforcing member and extending to the outer walls of the piston, the reinforcing member and the spaced wearing members being united with the piston in casting.

5. The combination of an internal combustion engine piston body composed of a light metal, with a cylindrical perforate metallic reinforcing member embedded within the walls of the piston, spaced wearing members attached to the reinforcing member and extending to the outer walls of the piston, said reinforcing member and wearing members composed of a metal having different characteristics than that of the piston body and united with the piston body in casting.

6. An internal combustion engine piston, comprising a head having a space where packing ring grooves are cut, wrist pin bosses and body portion, all formed of a relatively light metal; a cylindrical perforate metallic reinforcing member open at both ends and embedded in the body portion, spaced wearing buttons attached to the reinforcing member and extending outwardly to the surface of the body portion, all of which are permanently united by casting.

WILBUR T. SOULIS.